(12) United States Patent
Shastri et al.

(10) Patent No.: US 9,575,267 B1
(45) Date of Patent: Feb. 21, 2017

(54) PASSIVE ALIGNMENT OF OPTICAL COMPONENTS USING OPTICAL FIBER STUBS

(71) Applicant: Cisco Technology, Inc., San Jose, CA (US)

(72) Inventors: Kalpendu Shastri, Orefield, PA (US); Soham Pathak, Allentown, PA (US); Rao V. Yelamarty, Allentown, PA (US); Neeraj Kumar Dubey, Northhampton, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/930,857

(22) Filed: Nov. 3, 2015

(51) Int. Cl.
*G02B 6/42* (2006.01)

(52) U.S. Cl.
CPC ............. *G02B 6/4292* (2013.01); *G02B 6/421* (2013.01); *G02B 6/423* (2013.01); *G02B 6/425* (2013.01); *G02B 6/4243* (2013.01)

(58) Field of Classification Search
CPC ..... G02B 6/4292; G02B 6/4243; G02B 6/421; G02B 6/425; G02B 6/423
See application file for complete search history.

(56) References Cited

U.S. PATENT DOCUMENTS

| 6,848,838 B2 | 2/2005 | Doss et al. |
| 8,803,269 B2 | 8/2014 | Shastri et al. |
| 2002/0168168 A1* | 11/2002 | Iravani ................ G02B 6/3636 385/136 |
| 2008/0019646 A1 | 1/2008 | deJong |
| 2009/0297159 A1 | 12/2009 | Margolin et al. |

OTHER PUBLICATIONS

U.S. Appl. No. 14/629,182, entitled Optically Coupling Waveguides, filed Feb. 23, 2015.

\* cited by examiner

*Primary Examiner* — Ryan Lepisto
*Assistant Examiner* — Erin Chiem
(74) *Attorney, Agent, or Firm* — Patterson + Sheridan, LLP

(57) ABSTRACT

Embodiments herein include an optical system that passively aligns an optical component (e.g., a fiber array connector, lens array, lens body, etc.) with a semiconductor substrate using trenches that mate with optical fiber stubs. In one embodiment, the trenches are etched into the semiconductor substrate which provides support to optical devices (e.g., lasers, lens arrays, photodetectors, etc.) that transmit optical signals to, or receive optical signals from, the optical component. An underside of the optical component is etched to include at least two grooves (e.g., V-grooves) for receiving optical fiber stubs. In one embodiment, the optical fiber stubs are a portion of optical fiber that includes the core and cladding but not the insulative jacket. Once the fiber stubs are attached to the grooves, the fiber stubs are disposed into the trenches in the semiconductor substrate thereby passively aligning the optical component to the optical device on the substrate.

18 Claims, 7 Drawing Sheets

PASSIVE ALIGNMENT OF OPTICAL COMPONENTS USING OPTICAL FIBER STUBS

TECHNICAL FIELD

Embodiments presented in this disclosure generally relate to disposing optical components onto a semiconductor substrate. More specifically, the embodiments disclosed herein use fiber stubs to passively align an optical component to an optical device on the substrate.

BACKGROUND

Alignment of optical components to waveguides such as optical fibers with high coupling efficiency continues to be a challenge in the photonics industry. To align the optical components actively, dedicated equipment is required which uses a sub-micron resolution multi-stage axis system with integrated cameras to align the components. Not only is this equipment expensive, active alignment slows down the fabrication process and limits throughput.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
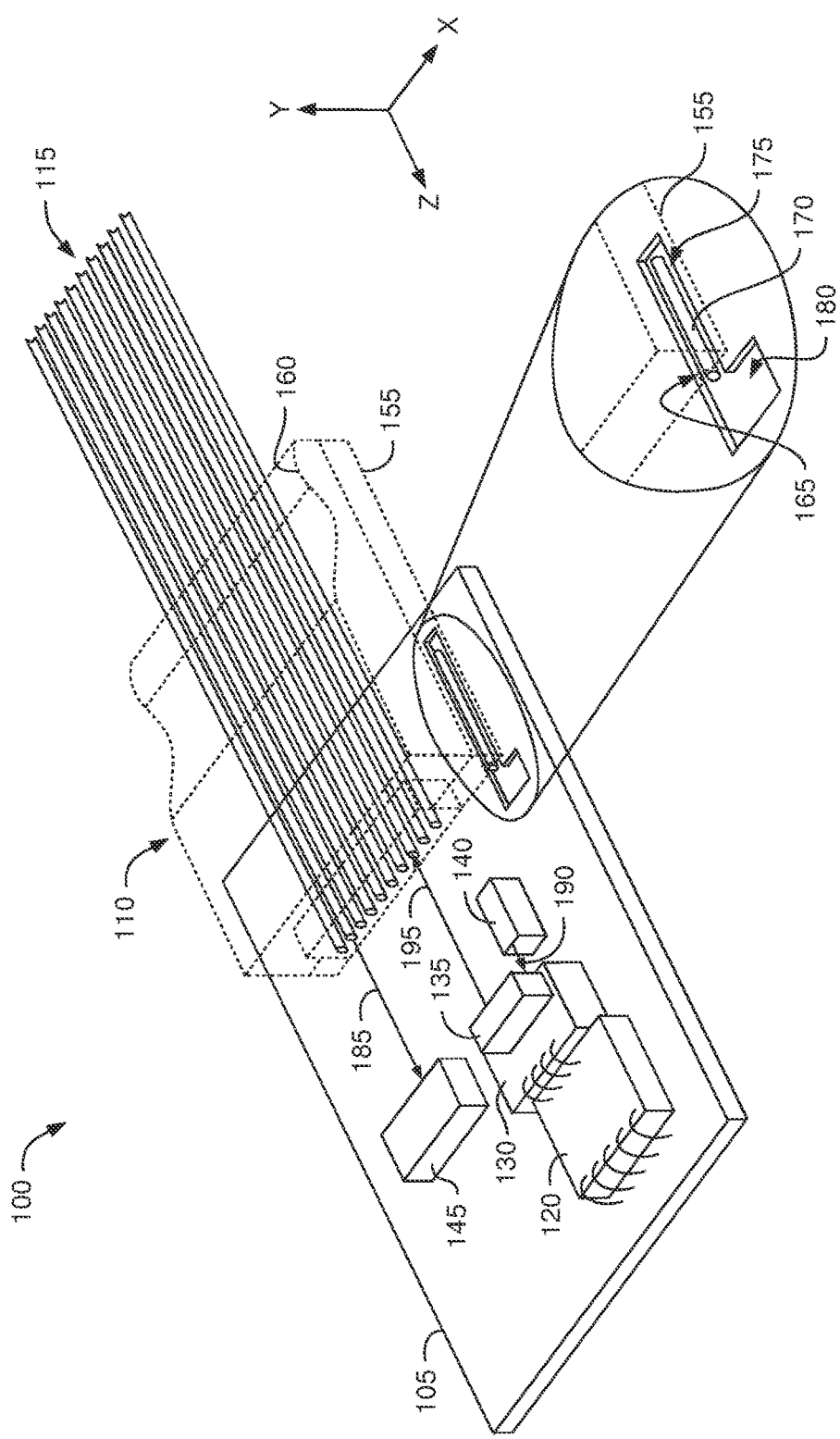
FIG. 1 illustrates an optical system including a fiber array connector passively aligned to a semiconductor interposer, according to one embodiment described herein.

One embodiment presented in this disclosure is an optical system that includes a semiconductor substrate comprising a plurality of trenches and an optical component comprising at least one lens and a plurality of grooves where the plurality of grooves are formed on a same surface of the optical component. The optical system includes a plurality of optical fiber stubs where each of the optical fiber stubs is at least partially disposed in one of the plurality of grooves and one of the plurality of trenches, whereby the optical fiber stubs establish optical alignment between the at least one lens and an optical device disposed on the semiconductor substrate.

Another embodiment of the present disclosure is a method of aligning an optical component comprising at least one lens and a plurality of grooves each containing an optical fiber stub. The method includes etching a plurality of trenches into a semiconductor substrate and disposing, at least partially, each of the optical fiber stubs into a respective one of the plurality of trenches thereby passively aligning the at least one lens to an optical device disposed on the semiconductor substrate in at least one direction.

Another embodiment of the present disclosure is an optical component that includes a body comprising a plurality of grooves formed in a same surface of the body and at least one lens. The optical component includes a plurality of optical fiber stubs, wherein each of the optical fiber stubs is at least partially disposed in one of the plurality of grooves, whereby the optical fiber stubs establish optical alignment between the at least one lens and an optical device external to the optical component. Moreover, the optical fiber stubs are not configured to transmit any optical signal.

Example Embodiments

Embodiments herein include an optical system that passively aligns an optical component (e.g., a fiber array connector, lens array, lens body, etc.) with a semiconductor substrate by mating trenches etched into the substrate with optical fiber stubs. In one embodiment, the semiconductor substrate is an interposer which provides support to optical components that transmit optical signals to, or receive optical signals from, a fiber array connector (FAC). An underside of the FAC is etched to include at least two grooves (e.g., V-grooves) for receiving the optical fiber stubs. In one embodiment, the optical fiber stubs are a portion of optical fiber cable that includes the core and cladding but not the insulative jacket. Once the fiber stubs are attached to the grooves, the fiber stubs are disposed into the trenches in the interposer, thereby passively aligning the FAC to an optical device (e.g., lens array, waveguide, photodetectors, etc.) mounted on the interposer. One advantage of using fiber stubs is that many manufactures can make optical fiber cable within tight tolerances—e.g., the total diameter of the core and cladding is within +/−0.7 microns. Placing the fiber stubs in the trenches passively aligns the FAC in at least two alignment directions while minimizing tilt relative to the interposer.

In another embodiment, the trenches are etched into a photonic chip or a laser module while the fiber stubs are disposed into grooves in a lens array or single lens structure. As above, disposing the fiber stubs in the trenches aligns the lenses to optical devices in the photonic chip or laser module (e.g., waveguides, optical adapters, lasers, etc.), thereby eliminating or reducing the amount of active alignment that must be performed. Although the optical components may be passively aligned in all directions, in some embodiments, placing the fiber stubs in the trench may align the optical components in two directions while active alignment is used to align the components in a third direction.

FIG. 1 illustrates an optical system 100 including a FAC 110 passively aligned on a semiconductor interposer 105, according to one embodiment described herein. In one embodiment, the interposer 105 is made from silicon, but could also be made from any material that permits precision etching to form the trenches described below. The interposer 105 forms a substrate on which various optical components are mounted. In this example, the interposer 105 provides support for the FAC 110, an electrical integrated circuit (IC) 120, a photonic chip 130, a laser module 140, and a receiver 145.

The FAC 110 includes an upper portion 160, a lower portion 155, a collimator array 150, and a plurality of optical fiber cables 115. For clarity, the lower portion 155 and the upper portion 160 of the FAC 110 are transparent in FIG. 1 so that the features inside and below the FAC 110 are visible. One or both of the upper portion 160 and lower portion 155 include grooves (e.g., U-grooves or V-grooves) that extend along the length of the FAC 110 which provide support to the optical fiber cables 115. In one embodiment, the lower portion 155 is made from a semiconductor material (e.g., silicon) and includes the grooves. Many fabrication techniques are known for forming V- or U-shaped grooves in a semiconductor material and these techniques will not be described in detail herein. In another embodiment, the lower portion 155 may be a glass substrate with machines V- or U-shaped grooves. Moreover, in addition to grooves on the underside, the lower portion 155 may also have grooves along its side or top surfaces.

The upper and lower portions 155, 160 are pressed together and attached (e.g., epoxied) to secure the optic cables 115 into place. In one embodiment, the upper portion 160 may be made from glass or other material suitable for mating with the lower portion 155 to hold the fiber optic cables 115 in place. Moreover, the optical cables 115 inside the FAC 110 may have been stripped of the insulative jackets such that these cables 115 only include the core and cladding. Outside of the FAC 110—i.e., the portion of the cables extending away from the interposer 105—the optical cables 115 may still include the jacket.

The optical fibers 115 (and the grooves in the lower portion 155) are aligned to the collimator array 150 which includes multiple lenses that each corresponds to one of the optical cables 115. The collimator array 150 collimates the lights outputted from the optic fibers 115 to generate collimated beams 185 that are received by optical components on the interposer 105. For example, the portion of the optical fibers 115 in the FAC 115 tasked with transmitting optical signals to the interposer 105 are aligned with the receiver 145. The receiver 145 may include a lens array and photodiodes for converting the received optical signals into corresponding electrical signals. In one example, the lens in the receiver 145 reflect the collimated beams 185 received from the FAC 115 down towards photodiodes that are parallel with the upper surface of the interposer 105. As discussed in greater detail below, the interposer 105 may have one or more through vias which transmit the electrical signals derived from the received optical signals to the lower surface of the interposer 105.

To transmit optical signals from the interposer 105 to the FAC 110, the laser module 140 generates a continuous wave (CW) optical signal 190 which strikes a lens array 135 mounted on the photonic chip 130. The lens array 135 focuses the CW signal 190 into a waveguide in the photonic chip 130 (e.g., a silicon photonic chip). The photonic chip 130 may include one or more optical modulators (e.g., Mach-Zehnder interferometers, ring resonators, Fabry-Perot cavities, etc.), sub-micron optical waveguides, CMOS circuitry, and the like. As shown in FIG. 1, the photonic chip 130 includes wire bonds to the electrical IC 120 which permit electrical data signals provided by the IC 120 to control the components in the photonic chip 130. For example, the photonic chip 130 may use the data signal to modulate the CW signal 190 using a modulation technique (e.g., quadrature phase shift keying (QPSK) or quadrature amplitude modulation (QAM)). Once modified, the photonic chip 130 transmits a modulated optical signal via the lens array 135 to the FAC 195. In one embodiment, the lens array 135 collimates the light to form collimated beams 195 which align with respective lens in the collimator array 150 in the FAC 110. The collimator array 150 focuses the collimated beams 195 into respective optical fibers 115. In this example, the interposer 105 and the FAC 110 include optical components for both transmitting optical signals to, and receiving optical signals from, each other.

Aligning the FAC 110 to the optical devices on the interposer 105, presents many challenges. As shown, lenses in the collimator array 150 are aligned with lenses in both the receiver 145 and the lens array 135 for receiving and transmitting optical signals. To permit this transfer of optical signals, the FAC 110 is aligned onto the interposer 105 in the x, y, and z directions. Moreover, any tilt in the FAC 110 along the x, y, or z directions can also misalign the optical paths between the FAC 110 and the receiver 145/lens array 135. For example, if the FAC 110 is tilted in the x-axis such that leftmost portion of the FAC 110 is slightly higher than the rightmost portion, the optical paths transmitting the collimated beams 195 may be aligned while the optical paths transmitting the collimated beams 185 are not.

Although active alignment may be used to align the FAC 110 with the components on the interposer 105, this requires expensive equipment and time to transmit test optical signals, measure the signal power, and adjust the location of the FAC 110 on the interposer 105 until the test signals achieve a desired threshold. Instead, the embodiments herein disclose an alignment structure that passively aligns the FAC 110 and the interposer 105. As used herein, "passively aligning" means that at least two components can be aligned optically in one or more directions without requiring the transmission and detection of optical test signals.

To passively align the FAC 110, the interposer 105 includes a trench 175 and a reservoir 180. The details of these features are provided in the blowout portion of FIG. 1. As shown there, the trench 175 and reservoir 180 are etched into the upper surface of the interposer 105. In one embodiment, a deep reactive ion etch (RIE) is used to generate the trench 175 and reservoir 180. Although FIG. 1 illustrates that these features have the same depth and could be formed during the same etching step, in other embodiments, the trench 175 may have a different depth than the reservoir 180.

A fiber stub 170 is placed into the trench 175 and the V-groove 165 of the lower portion 155 of the FAC 110. In one example, the fiber stub 170 is epoxied to the V-groove 165 before the FAC 110 is placed onto the interposer 105. As explained in more detail below, moving the FAC 110 and the interposer 105 relative to each other until the fiber stub 170 is located within the trench 175 passively aligns the FAC 110. Although only one trench 175 and reservoir 180 are shown in FIG. 1, the interposer 105 may include multiple trenches and reservoirs which align to a corresponding fiber stubs and V-grooves in the FAC 110.

In one embodiment, the features of the reservoir 180 may be used to passively align the FAC 110. For example, the edge of the reservoir 180 closest to the FAC 110 may be used to passively align the FAC 110 in the z-direction. For example, once the fiber stub 170 is deposited within the trench 175, a technician may move the FAC 110 in the z-direction using the trench 175 as a guide until the front side of the FAC 110 that includes the collimator array 150 is parallel with the edge of the reservoir 180 closest to the FAC 110. Stated differently, the trench 170 establishes a guide for sliding the fiber stub 170 (and the entire FAC 110) in the z-direction. Once aligned, epoxy is deposited into the reservoir 180 which uses a capillary action to draw the epoxy into the V-groove 165 thereby attaching the FAC 110 to the interposer 105.

Figure 2:
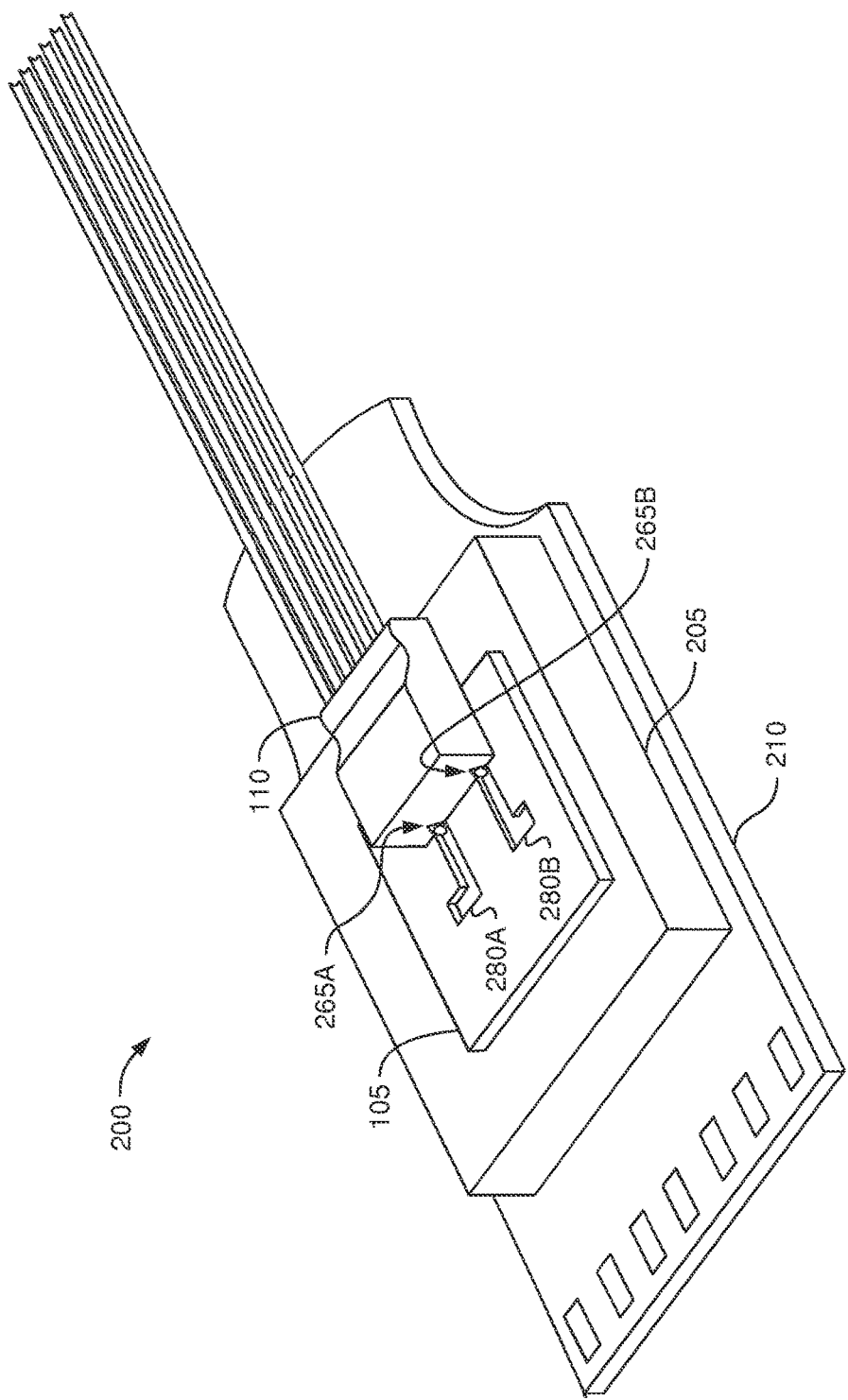
FIG. 2 illustrates an optical system including a fiber array connector passively aligned to a semiconductor interposer, according to one embodiment described herein.

FIG. 2 illustrates an optical system 200 including the FAC 110 which is passively aligned on the semiconductor interposer 105, according to one embodiment described herein. The interposer 105 is etched to include two reservoirs 280A and 280B along with two trenches (not shown). The FAC 110 includes two V-grooves 265A and 265B which receive respective fiber stubs deposited into the two trenches as shown in FIG. 1. For clarity, the various other electrical and optical components on the interposer 105 have been removed—i.e., IC, photonic chip, laser, receiver, etc.

The interposer 105 is placed on a ceramic substrate 205 and a printed circuit board (PCB) 210. In one embodiment, the interposer 105 includes multiple through vias which provide electrical connections between the components on its top surface (i.e., the surface coupled to the FAC 110) and its bottom surface (i.e., the surface coupled to the ceramic substrate 205). The optical system 200 may include bond pads and/or solder bumps for electrically connecting the through vias in the interposer 105 to electrical connections in the ceramic substrate 205. Moreover, the ceramic substrate 205 may include multiple electrical connections to the PCB 210. For example, the ceramic substrate 205 may include through vias or wire bonds that couple to the top surface of the PCB 210. Using the electrical connections in the ceramic substrate and the through vias in the interposer 105, the PCB 210 can transmit and/or receive electrical data signals from the components deposited on the top surface of the interposer 105. For example, the PCB 210 may serve as an interface to a computing device which provides electrical signals for modulating and generating an optical signal using the components on the interposer 105. Similarly, the components on the interposer 105 may receive optical signals from the FAC 110 and convert these signals into electrical signals that are transmitted to the computing device through the interposer 105, ceramic substrate 205 and PCB 210.

Figure 3:
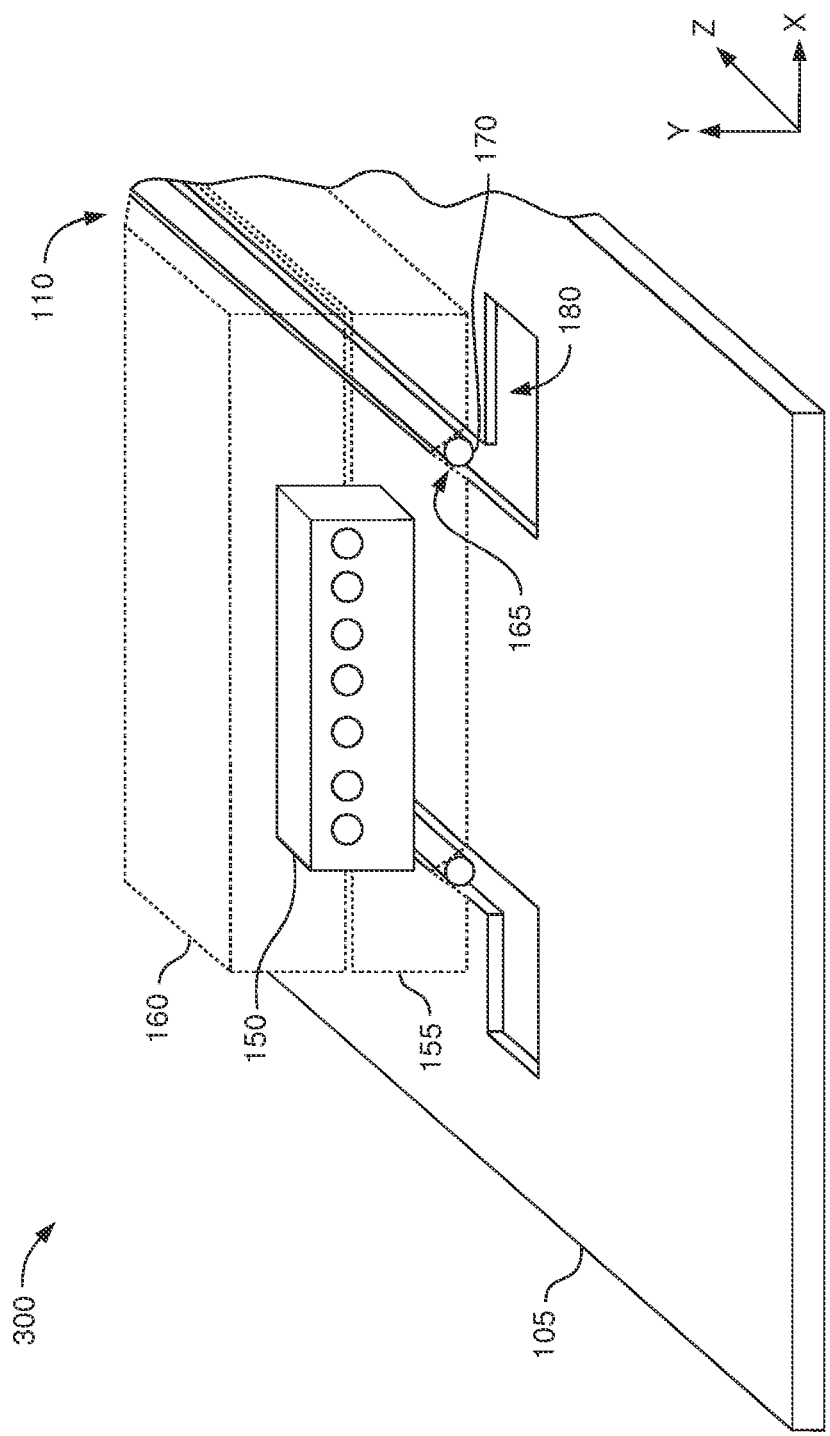
FIG. 3 illustrates a fiber array connector aligned to an interposer using fiber stubs, according to one embodiment described herein.

FIG. 3 illustrates an optical system 300 with the FAC 110 aligned to the interposer 105 using fiber stubs 170, according to one embodiment described herein. FIG. 3 illustrates a close up side view of the interface between the FAC 110 and the interposer 105 shown in FIG. 1. The other components on the interposer 105 are removed for clarity. Moreover, the lower and upper portions 155, 160 of the FAC 110 are shown as being made from a transparent material so that the V-grooves 165 and fiber stubs 170 are visible. However, in other embodiments, the lower and upper portions 155, 160 may be made from opaque materials.

As shown, the fiber stubs 170 are positioned within the V-grooves 165 such that the each fiber stub 170 contacts both walls of the respective V-groove 105. Moreover, the fiber stubs 170 contact the bottom surface and/or side surfaces of the trenches etched into the interposer 105. Placing the fiber stubs 170 into the trenches establish the orientation of the FAC 110 onto the interposer 105 in the x and y directions. As discussed above, the orientation of the FAC 110 along the z direction may be established by using an edge of the reservoir 180 or by using some other alignment marker. Moreover, by including two trenches in the interposer 105 and two fiber stub/V-groove combinations in the FAC 110, the fiber stubs 170 also set the tilt of the FAC 110 relative to the interposer 105 along the x, y, and z directions.

In one embodiment, the fiber stubs 170 include the core and cladding (but not the jacket) of an optical fiber cable. One reason for using optical fiber cable for the fiber stubs 170 is because optical fibers are manufactured within tight tolerances which means the FAC 110 can be aligned precisely on the interposer 105. For example, the diameter of the fiber stubs 170 may range between +/−0.7 microns. The type of optical fiber used to form the fiber stubs 170 does not matter so long as the diameter of the optical fiber is manufactured with tolerances less than 1.5 microns. For example, the fiber stubs 170 may made from single mode or multi-mode optical fibers. As shown, the fiber stubs 170 are not used to carry light or an optical signal (i.e., the stubs 170 are not coupled to any light source), but rather to align the FAC 110 and the interposer 105. The length of the fiber stubs 170 (i.e., the amount of optical fiber cable cut off to form the fiber stubs 170) may vary according to the length of the trenches etched into the interposer 105 and the FAC 110.

Figure 4:
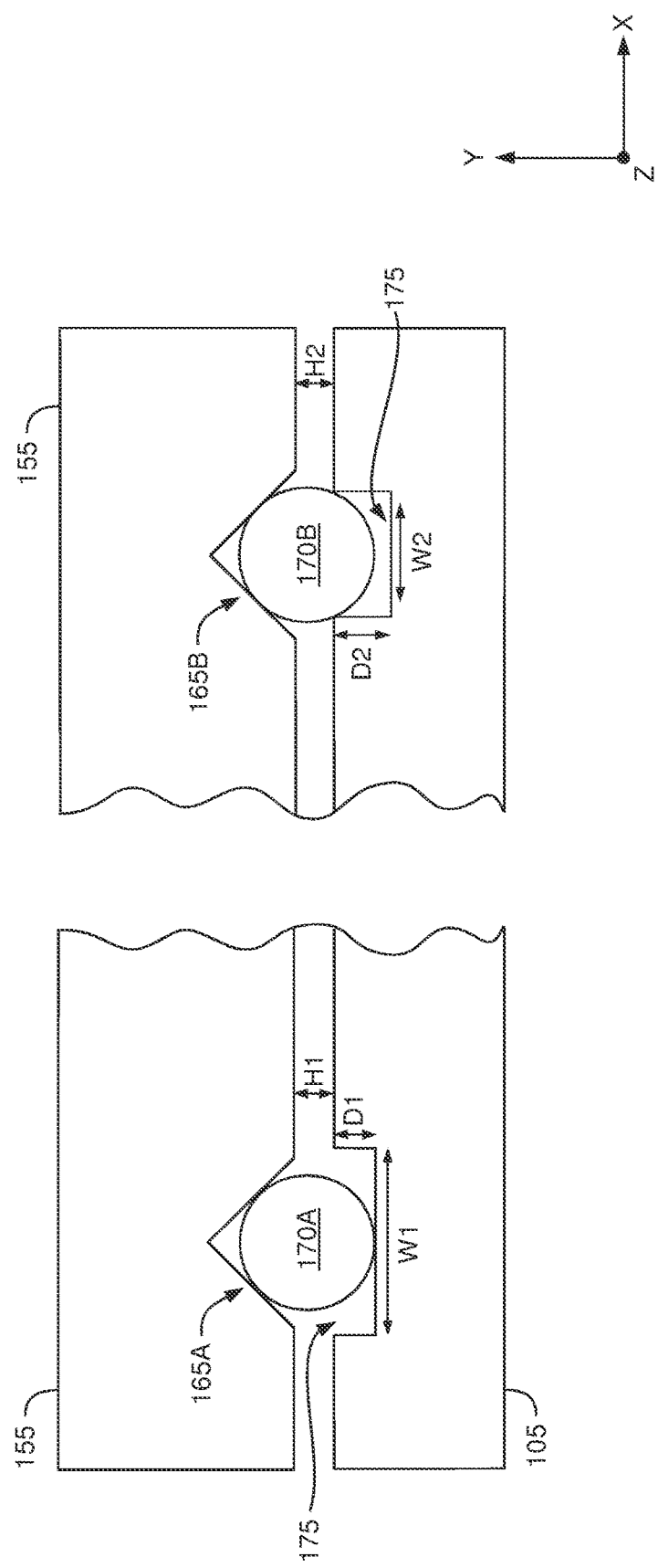
FIG. 4 illustrates different sized trenches in the interposer for receiving fiber stubs, according to one embodiment described herein.

FIG. 4 illustrates different sized trenches 175 in the interposer 105 for receiving fiber stubs 170, according to one embodiment described herein. For example, FIG. 4 may be a cross sectional view of the optical system shown in FIG. 3 where the FAC is disposed over the interposer 105. In FIG. 4, only the lower portion 155 of the FAC is shown.

The left trench 175A has a depth D1 and width W1 that is different from the depth D2 and width W2 of the right trench 175B. In this example, the depth D1 of trench 175A is less than the depth D2 of trench 175B, while the width W1 of trench 175A is greater than the width W2 of trench 175B. In one embodiment, the width W1 is greater than the diameter of the fiber stubs 170, while the width W2 is less than the diameter of the fiber stubs 170. As such, the fiber stub 170A contacts the bottom surface of trench 175A, but the fiber stub 170B does not contact the bottom surface of trench 175B. Instead, the fiber stub 170B rests on the sides of the trench 175B. As such, the width W2 determines how far the fiber stub 170B extends into the trench 175B, thereby establishing the distance between the interposer 105 and the bottom portion 155 of the FAC in the y direction. In contrast, the depth D1 determines how far the fiber stub 170A extends into the trench 175A, thereby establishing the distance between the interposer 105 and the bottom portion 155 in the y direction. In sum, the separation distance between the FAC and interposer 105 is established in the right trench 175B by controlling the width W2 but this distance is established in the left trench 175A by controlling the depth D1. In one embodiment, the width W2 and depth D1 are set such that the heights H1 and H2 are the same, and as such, there is no (or a very small) tilt of the FAC along the x direction.

One advantage of using the width W2 to control the height H2 and the depth D1 to control the height H1 is that the separation distance between the V-grooves 165A and 165B may vary. That is, the bottom portion 155 may be manufactured such that the distance between the V-grooves 165A and 165B can vary by +/−3 microns. Such a large variation means that the V-grooves 165A and 165B may not be spaced the same distance as the spacing between the trenches 175A and 175B in the interposer 105. These disparate distances may prevent the FAC from aligning properly with the interposer 105. For example, if both trenches used the width to set the height between the FAC and interposer 105 as shown by right trench 175B and the distance between the trenches 175 and the V-grooves 165 did not match, one of the fiber stubs 170 would not align with a trench. Put differently, one of the fiber stubs would be disposed in a trench but the other stub would not. Instead, having one trench with a width greater than the diameter of the fiber stub 170 enables the interposer 105 to accommodate the tolerance variation in the distance between the V-grooves 165A and 165B. For example, even if the distance between the V-grooves 165A and 165B increases, the left fiber stub 170A would be moved over to the left in the trench 175A but the right fiber stub 170B would still register with the sides of the right trench 175B. Thus, even as the distance between the V-grooves 165A and 165B varies, the trenches 175A and 175B can still set the heights H1 and H2 to the same value.

Alternatively, if both trenches used the depths D1 and D2 to set the height between the FAC and interposer 105 as shown by the left trench 175A, the trenches 175 could no longer passively align the FAC 110 in the x direction. That is, the FAC 110 could still be aligned in the y direction because the depths of the trenches 175 are controlled, but the sides of the trench 175B are what align the FAC in the x direction. If the widths of both trenches were greater than the diameter of the fiber stubs 170, then the fiber stubs 170 could slide within the trenches and may need to be actively aligned in the x direction. Instead, once the fiber stub 170B registers with the side walls of the right trench 175B, then the technician knows the FAC is aligned in the x direction. Furthermore, the variable distance between the V-grooves 165 can be accommodated by the left trench 175A which permits the fiber stub 170A to move to the left or right and still rest on the bottom surface of the trench 175A thereby establishing the desired height H1.

The values of the widths W1 and W2 and depths D1 and D2 will vary according to the dimensions of the fiber stubs 170 and the arrangement of the components in the FAC and interposer 105. For example, the width W2 may be smaller when a fiber stub 170 with a diameter of 120 microns is used instead of a fiber stub 170 with a diameter of 150 microns. Thus, the dimensions of the trenches 175 can be adjusted to accommodate different types of fibers stubs (e.g., fiber stubs made using multi-modal and single mode optical fibers) and optical arrangements of the components in the FAC and interposer 105.

In an embodiment where the distance between the V-grooves 165 in the lower portion 155 has tighter tolerances—e.g., less than +/−1 micron—the interposer 105 may include two trenches with widths that are less than the diameter of the fiber stubs 170. As such, the stubs 170 will register with the side of the trenches but not the bottom of the trenches as shown by trench 175B. Put differently, if the distance between V-grooves 165A and 165B does not vary substantively, the interposer 105 may include two trenches like the right trench 175B rather than one of each kind as shown in FIG. 4.

Figure 5:
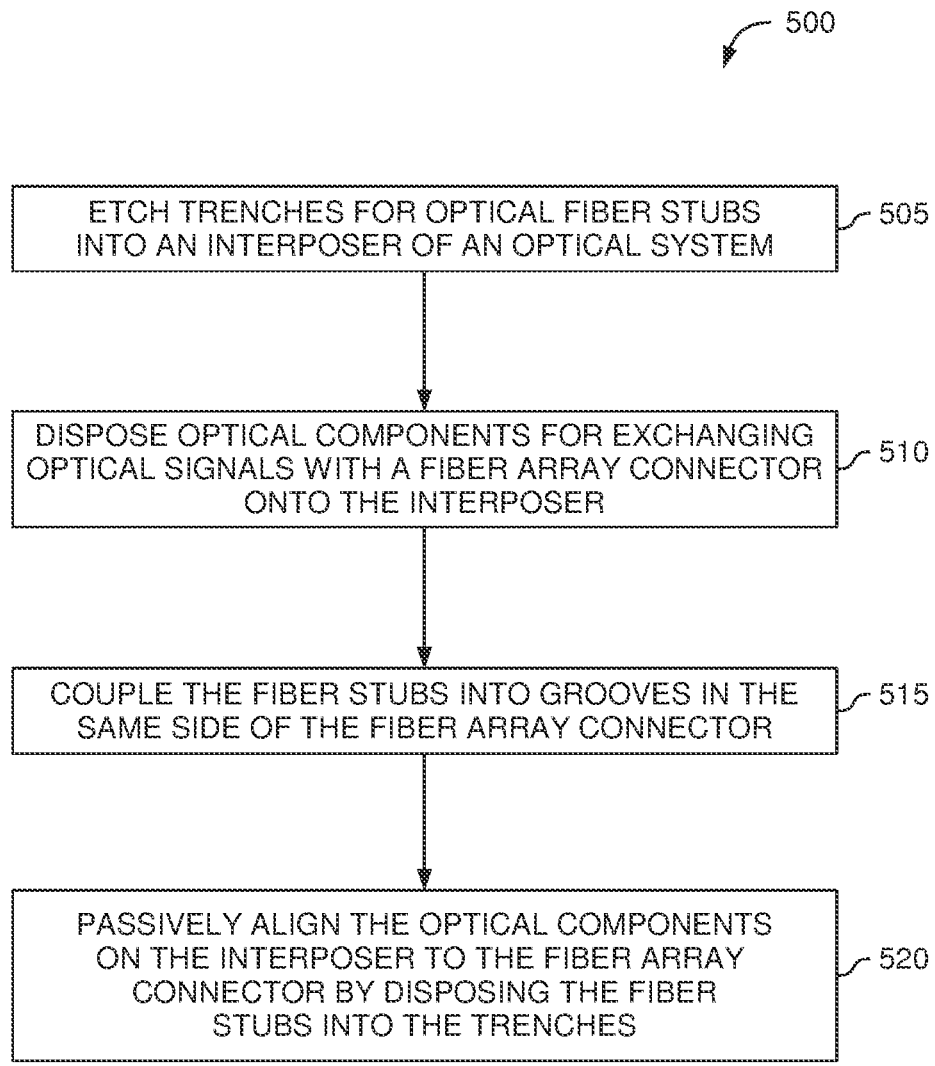
FIG. 5 is a flow chart for passively aligning a fiber array connector to an interposer, according to one embodiment described herein.

FIG. 5 is a flow chart for a method 500 of passively aligning a FAC to an interposer, according to one embodiment described herein. At block 505, trenches are etched for optical fiber stubs into the interposer of an optical system. In one embodiment, the interposer may be located on a semiconductor wafer that includes multiple interposers. In this example, the trenches may be etched onto the interposers in the wafer using the same processing steps. Using the trenches shown in FIG. 4 as an example, at Time A, all the interposers in the wafer may be etched using deep RIE to form a trench like the left trench 175A where the width of the trench is wider than the diameter of the fiber stub 170A.

At Time B, all the interposers may be etched to form a trench like the right trench 175B where the width of the trench is smaller than the diameter of the fiber stub 170B. In this manner, the trenches may be formed using a wafer-level processing technique. Moreover, before etching the trenches, the interposer may have already been processed to include other features such as electrical connections for the IC or the through vias that electrical connect a top surface of the interposer to a bottom surface.

At block 510, optical components are disposed onto the interposer for receiving optical signals from, or transmitting optical signals to, the FAC. In one embodiment, the interposer includes only components for receiving optical signals from the FAC. In another embodiment, the interposer includes only components or transmitting optical signals to the FAC. Alternatively, as shown in FIG. 1, the interposer may include components for both transmitting and receiving optical signals.

The optical devices on the interposer may be aligned before being fixed onto the interposer. As shown in FIG. 1, the laser module 140 and photonic chip 130 may be aligned to the lens array 135 to ensure that the CW generated by the laser module 140 is properly introduced into the photonic chip 130 and that the modulated wave generated by the photonic chip 130 is collimated by one of the lenses in the lens array 135. Moreover, the lens array and photodetectors in the receiver 145 may be aligned to ensure light received from the FAC 110 is reflected by the lens array onto the detectors. These alignments may be performed using passive alignment techniques and/or active alignment techniques.

At block 515, the fiber stubs are coupled into grooves in the same surface or plane of the FAC. As described above, the bottom surface of the FAC which faces the interposer may include two V-grooves that are at least as long as the fiber stubs. Because the fiber stubs are used to align the FAC to the interposer rather than being used to carry an optical signal, the fiber stubs may contact both sides of the V-grooves to ensure proper alignment. An epoxy material may be used to fix the fiber stubs into the V-grooves.

At block 520, the optical components on the interposer are passively aligned to the FAC by disposing the fiber stubs into the trenches etched at block 505. Put differently, placing the fiber stubs into the trenches passively aligns the FAC to the interposer in at least one alignment axis or direction. In the embodiment shown in FIG. 4, by using different types of trenches 175, the FAC is passively aligned in two alignment axis (e.g., the x and y directions) when the fiber stubs are disposed in the trenches 175. Moreover, to align in the z direction, the upper surface of the interposer may include an alignment mark that aligns with a leading edge of FAC on which the collimator array is exposed. For example, a side of the reservoir 180 shown in FIG. 3 may be used by a technician to align the FAC in the z direction.

Once aligned, an adhesive may be used to secure the fiber stubs (which were previously secured to the FAC) to the interposer. In one embodiment, epoxy is deposited into the reservoir after the FAC is aligned on the interposer. A capillary action pulls the epoxy into the V-groove and the trench thereby fixing the FAC to the interposer. However, in other embodiments, the epoxy may be injected into the trench, or the epoxy may be place in the trench before the fiber stub is disposed into the trench so long as the epoxy does not interfere with aligning the FAC.

FIGS. 6A-6D illustrate passively aligning the lens array 135 to the photonic chip 130 using fiber stubs, according to one embodiment described herein. In one example, the process shown by FIGS. 6A-6D may be performed when arranging and aligning the optical devices on the interposer. This process may occur before the FAC is disposed on the interposer using the fiber stubs as described in method 500.

Figure 6C:
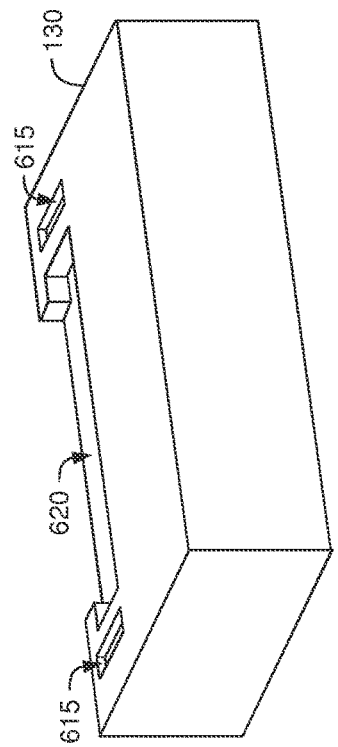
FIGS. 6A-6D illustrate passively aligning a lens array to a photonic chip using fiber stubs, according to one embodiment described herein.
Figure 6D:
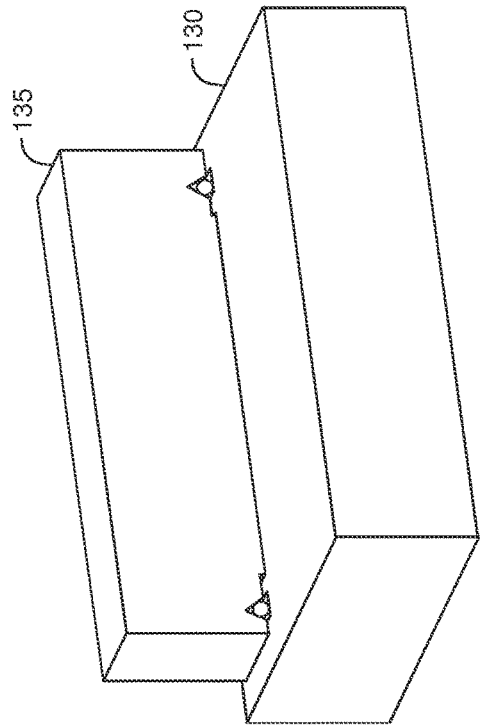
Figure 6A:
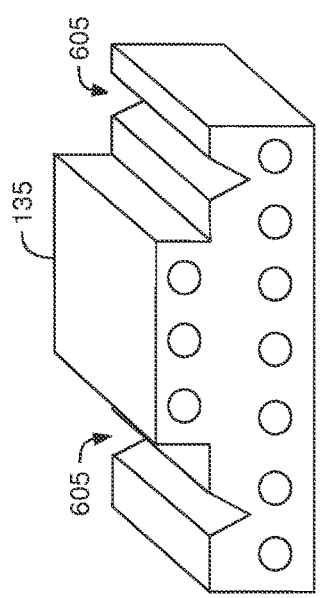

FIG. 6A illustrates the bottom surfaces of the lens array 135 which includes a body that encapsulates lenses used to collimate optical signals received from the photonic chip 130 or focus a CW received from the laser module (not shown). The body and lenses of the lens array 135 may be made from a semiconductor material such as silicon. In another example, the body may be made from a semiconductor material while the lenses are made from glass. As shown, the lens array 135 includes two V-grooves 605 adapted to receive fiber stubs. The V-grooves 605 may have similar dimensions as the V-grooves formed in the FAC discussed above except the length of the V-grooves 605 may be shorter since the lens array 135 is typically shorter than the FAC.

Figure 6B:
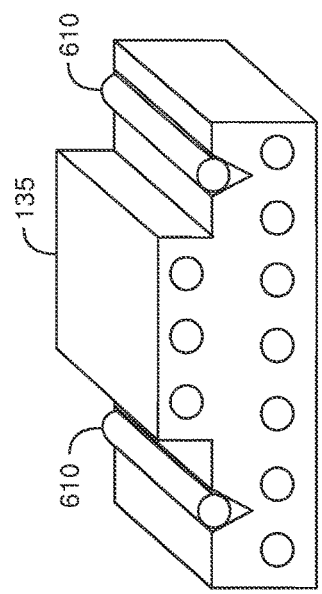

FIG. 6B illustrates disposing fiber stubs 610 into the V-grooves of the lens array 135. Epoxy may be used to attach the fiber stubs 610 to the lens array 135. The epoxy may be applied either before the fiber stubs 610 are disposed in the V-grooves (e.g., a small amount of epoxy may be disposed in the grooves) or after the fiber stubs 610 have been placed in the grooves.

FIG. 6C illustrates the photonic chip 130 before the lens array 135 is placed onto the chip 130. The photonic chip 130 includes a platform 620 which is recessed relative to the upper surface of the photonic chip 130 to provide room for the lens array 130 to extend down towards the bottom surface of the photonic chip 130. Although not shown, one or more waveguides may terminate at or near the upper surface of the photonic chip 130. These waveguides either receive an optical signal from, or transmit an optical signal to, a lens in the lens array 135.

Moreover, the photonic chip 130 includes trenches 615 which correspond to the V-grooves 605 shown in FIG. 6A. In one embodiment, the trenches may have different depths and widths as shown in FIG. 4, although this is not a requirement. For example, the width of the right trench 615 may be smaller than the diameter of the fiber stubs 610 such that the fiber stub registers with the side walls of the trench. Moreover, the depth of the right trench 615 may be deep enough such that the fiber stub 610 does not contact its bottom surface. The left trench 615, in contrast, may have a width greater than the diameter of the fiber stub 610 which accommodates differences between the distances between the V-grooves 605 and the trenches 615.

FIG. 6D illustrates passively aligning the lens array 135 to the photonic chip 130 using the fiber stubs 610. Relative to the view shown in FIG. 6A, the lens array 135 is rotated so the bottom surface (which is facing up in FIG. 6A) now faces the platform 620 and the extension of the lens array 135 between the grooves 605 extends down into the recess of the photonic chip 130. Moreover, the fiber stubs 610 are disposed within the trenches 615 thereby passively aligning the lens array 135 in one or more alignment axes. In one embodiment, active alignment may also be used to align the lens array 135 and photonic chip 130. For example, the fiber stubs 610 may passively align the lens array 135 in the x and y directions, while the lens array 135 is actively aligned in the z direction.

FIGS. 7A-7D illustrate passively aligning a silicon lens body 700 to the laser module 140 using fiber stubs 710, according to one embodiment described herein. In one example, the process shown by FIGS. 7A-7D may be performed when arranging and aligning the optical devices on the interposer. This process may occur before the FAC is disposed on the interposer using the fiber stubs as described in method 500.

Figure 7A:
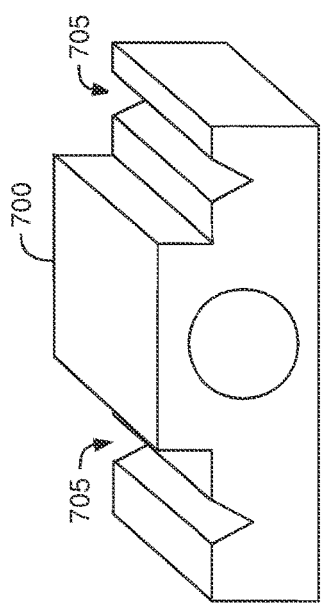
FIGS. 7A-7D illustrate passively aligning a silicon lens to a laser module using fiber stubs, according to one embodiment described herein.

FIG. 7A illustrates the bottom surfaces of the silicon lens body 700 which includes two V-grooves 705. Like the lens array 135, the lens body 700 has an extension between the grooves 705 that provides room for the silicon lens. In one example, both the body 700 and the lens are made out of a semiconductor material such as silicon. The V-grooves 705 are adapted to receiver fiber stubs and may have similar dimension as the V-grooves formed in the FAC except the length of the V-grooves 705 may be shorter since the lens body 700 is typically shorter than the FAC.

Figure 7B:
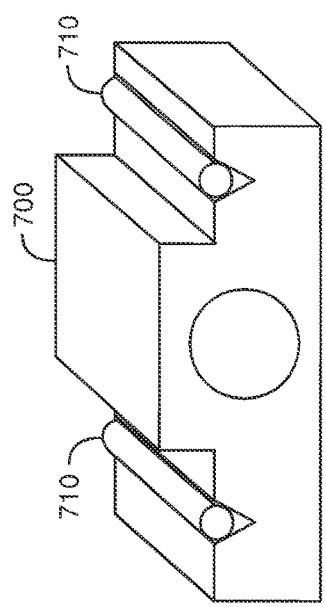

FIG. 7B illustrate disposing the fiber stubs 710 into the V-grooves 705. Epoxy may be used to attach the fiber stubs 710 to the body 700. The epoxy may be applied either before the fiber stubs 710 are disposed in the V-grooves 705 (e.g., a small amount of epoxy may be disposed in the grooves) or after the fiber stubs 710 have been placed in the grooves 705.

Figure 7C:
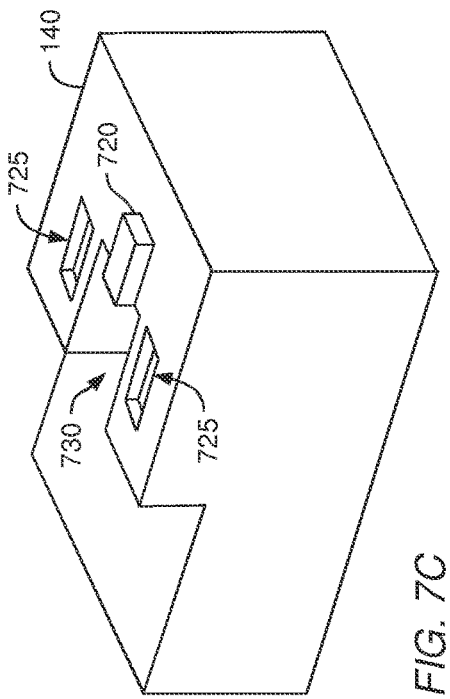

FIG. 7C illustrates the laser module 140 before the silicon lens body 700 is placed onto the module 140. The laser module 140 includes a laser 720 which generates a CW optical signal that is then collimated by the silicon lens. The laser module 140 also includes two trenches 725 and a recess 730. The trenches 725 correspond to the V-grooves 705 in the lens body 700. In one embodiment, the trenches 725 may have different depths and widths as shown in FIG. 4, but in other embodiments, the dimensions of the trenches 725 may be the same.

Figure 7D:
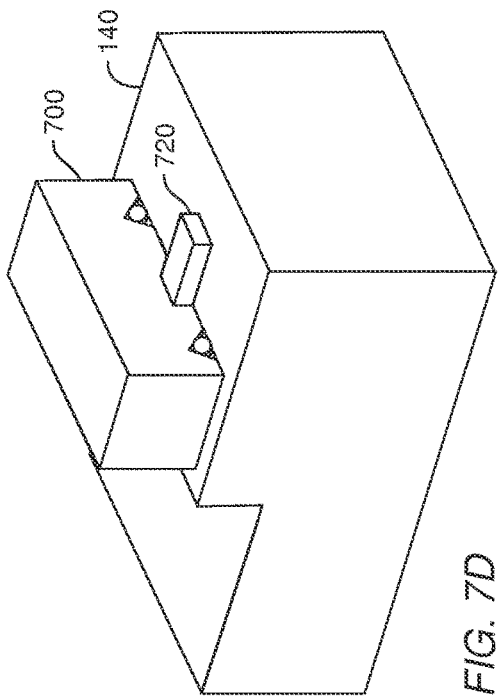

FIG. 7D illustrates aligning the silicon lens body 700 to the laser module 140 using the fiber stubs 710 and trenches 725 as guides. Relative to the view shown in FIG. 7A, the body 700 is rotated so the bottom surface (which is facing up in FIG. 7A) and the extension of the body 700 are within the recess 730 in the laser module 140. Moreover, the fiber stubs 710 are disposed within the trenches 725 thereby passively aligning the lens body 700 in one or more alignment axes to the laser 720. In one embodiment, active alignment may also be used to align the lens body 700 and laser module 140. For example, the fiber stubs 710 may passively align the lens body 700 in the x and y directions, while the lens body 700 is actively aligned in the z direction.

The flowchart and block diagrams in the Figures illustrate the architecture, functionality and operation of possible implementations of systems or methods according to various embodiments. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In view of the foregoing, the scope of the present disclosure is determined by the claims that follow.

We claim:
1. An optical system, comprising:
a semiconductor substrate comprising a plurality of trenches;
an optical component comprising at least one lens and a plurality of grooves, wherein the plurality of grooves are formed on a same surface of the optical component; and
a plurality of optical fiber stubs, wherein each of the optical fiber stubs is at least partially disposed in one of the plurality of grooves and one of the plurality of trenches, whereby the optical fiber stubs establish opti- cal alignment between the at least one lens and an optical device disposed on the semiconductor substrate, wherein a first trench of the plurality of trenches includes a width that is less than a diameter of the optical fiber stubs and a second trench of the plurality of trenches includes a width that is greater than a diameter of the optical fiber stubs, and wherein a depth of the first trench is greater than a depth of the second trench.

2. The optical system of claim 1, wherein the optical fiber stubs are not coupled to any light source in the optical system.

3. The optical system of claim 1, wherein each of the optical fiber stubs includes a core and a cladding, but not a jacket, of an optical fiber cable.

4. The optical system of claim 1, wherein the plurality of grooves are formed along a same plane of the optical component, wherein each of the plurality of grooves is one of a V-groove and a U-groove, and wherein each of the plurality of trenches has a square cross section.

5. The optical system of claim 1, wherein the depth of the first trench ensures a first fiber stub deposited in the first trench does not contact a bottom surface of the first trench, and wherein the depth of the second trench ensures a second fiber stub deposited in the second trench does contact a bottom surface of the second trench.

6. The optical system of claim 1, wherein the semiconductor substrate is a laser module and the optical device is a laser configure to transmit a continuous wave to the at least one lens, and wherein the optical component is a silicon lens body.

7. The optical system of claim 1, wherein the semiconductor substrate is an interposer including a plurality of through vias for electrically connecting a top surface of the interposer comprising the plurality of trenches to an opposite, bottom surface of the interposer, and wherein the optical component is a fiber array connector.

8. The optical system of claim 1, wherein the semiconductor substrate is a photonic chip and the optical device is at least one waveguide for transmitting light to, or receiving light from, the at least one lens, and wherein the optical component comprises a lens array optically aligned to the photonic chip.

9. A method of aligning an optical component comprising at least one lens and a plurality of grooves each containing an optical fiber stub, the method comprising:
etching a plurality of trenches into a semiconductor substrate, wherein a first trench of the plurality of trenches includes a width that is less than a diameter of the optical fiber stubs and a second trench of the plurality of trenches includes a width that is greater than a diameter of the optical fiber stubs, wherein a depth of the first trench is greater than a depth of the second trench; and disposing, at least partially, each of the optical fiber stubs into a respective one of the plurality of trenches thereby passively aligning the at least one lens to an optical device disposed on the semiconductor substrate in at least one direction.

10. The method of claim 9, wherein each of the optical fiber stubs includes a core and a cladding, but not a jacket, of an optical fiber cable.

11. The method of claim 9, further comprising:
attaching the optical fiber stubs into the plurality of grooves before disposing the optical fiber stubs into the plurality of trenches.

12. The method of claim 9, wherein the depth of the first trench ensures a first fiber stub deposited in the first trench does not contact a bottom surface of the first trench, and wherein the depth of the second trench ensures a second fiber stub deposited in the second trench does contact a bottom surface of the second trench.

13. The method of claim 9, further comprising:
etching in parallel respective trenches in multiple semiconductor substrates in a semiconductor wafer.

14. An optical component, comprising:
a body comprising a plurality of grooves formed in a same surface of the body;
at least one lens; and
a plurality of optical fiber stubs, wherein each of the optical fiber stubs is at least partially disposed in one of the plurality of grooves, whereby the optical fiber stubs establish optical alignment between the at least one lens and an optical device external to the optical component, wherein the optical fiber stubs are not configured to transmit any optical signal and
wherein a first grooves of the plurality of grooves includes a width that is less than a diameter of the plurality of optical fiber stubs and a second groove of the plurality of grooves includes a width that is greater than a diameter of the plurality of optical fiber stubs, and wherein a depth of the first groove is greater than a depth of the second groove.

15. The optical component of claim 14, wherein each of the optical fiber stubs includes a core and a cladding, but not a jacket, of an optical fiber cable.

16. The optical component of claim 14, wherein the plurality of grooves are formed along a same plane of the body.

17. The optical component of claim 14, further comprising a plurality of lenses arranged in an array.

18. The optical component of claim 14, wherein the body and the lens are formed from a semiconductor material.

* * * * *